(12) United States Patent
Innanje et al.

(10) Patent No.: US 11,861,480 B2
(45) Date of Patent: Jan. 2, 2024

(54) ORIENTATION DETECTION IN OVERHEAD LINE INSULATORS

(71) Applicant: SIEMENS AKTIENGESELLSCHAFT, Munich (DE)

(72) Inventors: Arun Innanje, Dayton, OH (US); Kuan-Chuan Peng, Plainsboro, NJ (US); Ziyan Wu, Lexington, MA (US); Jan Ernst, Princeton, NJ (US)

(73) Assignee: Siemens Mobility GmbH, Munich (DE)

( * ) Notice: Subject to any disclaimer, the term of this patent is extended or adjusted under 35 U.S.C. 154(b) by 303 days.

(21) Appl. No.: 17/267,163

(22) PCT Filed: Aug. 21, 2018

(86) PCT No.: PCT/US2018/047138
§ 371 (c)(1),
(2) Date: Feb. 9, 2021

(87) PCT Pub. No.: WO2020/040734
PCT Pub. Date: Feb. 27, 2020

(65) Prior Publication Data
US 2021/0304437 A1 Sep. 30, 2021

(51) Int. Cl.
*G06T 7/73* (2017.01)
*G06T 7/11* (2017.01)
(Continued)

(52) U.S. Cl.
CPC ................. *G06N 3/04* (2013.01); *G06T 7/11* (2017.01); *G06T 7/74* (2017.01); *G06V 10/243* (2022.01); *G06V 10/764* (2022.01); *G06V 10/82* (2022.01); *G06V 20/13* (2022.01); *G06V 20/17* (2022.01); *G06T 2207/20081* (2013.01); *G06T 2207/20084* (2013.01)

(58) Field of Classification Search
CPC .... G06N 3/04; G06N 3/08; G06T 7/11; G06T 7/74; G06T 2207/20081; G06T 2207/20084; G06T 3/4038; G06V 10/243; G06V 10/764; G06V 10/82; G06V 20/13; G06V 20/17
See application file for complete search history.

(56) References Cited

U.S. PATENT DOCUMENTS 11,297,820 B1 * 4/2022 Tang .................... A01M 7/0089
11,361,423 B2 * 6/2022 Toth ....................... G06T 7/0004
(Continued)

OTHER PUBLICATIONS

PCT International Search Report and Written Opinion of International Searching Authority dated Apr. 4, 2019 corresponding to PCT International Application No. PCT/US2018/047138 filed Aug. 21, 2018.

(Continued)

*Primary Examiner* — Mia M Thomas

(57) ABSTRACT

Systems, methods, and computer-readable media are described for determining the orientation of a target object in an image and iteratively reorienting the target object until an orientation of the target object is within an acceptable threshold of a target orientation. Also described herein are systems, methods, and computer-readable media for verifying that an image contains a target object.

12 Claims, 5 Drawing Sheets

(51) Int. Cl.
*G06V 10/24* (2022.01)
*G06V 10/764* (2022.01)
*G06V 10/82* (2022.01)
*G06V 20/13* (2022.01)
*G06V 20/17* (2022.01)
*G06N 3/04* (2023.01)

(56) References Cited

U.S. PATENT DOCUMENTS

| | | | |
|---|---|---|---|
| 2017/0213112 A1 | 7/2017 | Sachs et al. | |
| 2017/0286809 A1* | 10/2017 | Pankanti | G06N 3/08 |
| 2017/0287137 A1 | 10/2017 | Lin et al. | |
| 2017/0344860 A1* | 11/2017 | Sachs | G06V 40/169 |
| 2018/0174046 A1* | 6/2018 | Xiao | G06F 18/24133 |
| 2018/0232887 A1* | 8/2018 | Lin | G06T 7/11 |
| 2019/0266435 A1* | 8/2019 | Yu | G06V 30/413 |
| 2020/0211200 A1* | 7/2020 | Xu | G06V 10/26 |
| 2020/0290608 A1* | 9/2020 | Liu | B60W 10/20 |
| 2020/0327360 A1* | 10/2020 | Samala | G06F 18/2413 |
| 2020/0327690 A1* | 10/2020 | Cai | G06V 20/58 |
| 2020/0380279 A1* | 12/2020 | Yang | G06F 17/18 |
| 2021/0224577 A1* | 7/2021 | Samala | G06V 30/1916 |
| 2023/0074477 A1* | 3/2023 | Huq | G01S 7/417 |

OTHER PUBLICATIONS

Yi Li et al: "DeepIM: Deep Iterative Matching for 6D Pose Estimation", Arxiv.org, Cornell University Library, 201 Olin Library Cornell University Ithaca, NY 14853, Mar. 31, 2018 (Mar. 31, 2018), XP080866573 / Mar. 31, 2018.

Sey Ed Maj Id Azimi et al: "Towards Multi-class Object Detection in Unconstrained Remote Sensing Imagery", Arxiv.org, Cornell University Library, 201 Olin Library Cornell University Ithaca, NY 14853, Jul. 7, 2018 (Jul. 7, 2018), XP081040078 / Jul. 7, 2018.

Balakrishnan Guha et al: "Synthesizing Images of Humans in Unseen Poses", 2018 IEEE/CVF Conference on Computer Vision and Pattern Recognition, IEEE, Jun. 18, 2018 (Jun. 18, 2018), pp. 8340-8348, XP033473757 / Jun. 18, 2018.

* cited by examiner

ORIENTATION DETECTION IN OVERHEAD LINE INSULATORS

This application is a national phase filing under 35 U.S.C. § 371 of International Patent Application No. PCT/US2018/047138, filed Aug. 21, 2018, which is incorporated herein by reference in its entirety.

BACKGROUND

The present invention relates generally to orientation detection of a target object in an image, and more specifically, to orientation detection and orientation correction of overhead line insulator images using a multi-stage classification approach.

High-voltage overhead transmission lines (OHLs) may include ceramic or glass insulators for electrical insulation. Broken or defective insulators can present a safety hazard that can lead to electrocution and/or cascading failures. To avoid these potential safety issues, periodic manual inspection of OHLs is performed. Manual inspection, however, can itself present a safety risk to inspection personnel if there is significant damage to an insulator. In addition, manual inspection is time-consuming and not cost-effective. Moreover, in some cases, manual inspection may not be feasible due to accessibility constraints.

Recent advances in aerial surveillance using drones, for example, can obviate the need for manual inspection of OHLs. While existing deep learning approaches are available for identifying insulators in images captured by aerial surveillance, they suffer from a number of drawbacks including, for example, the inability to accurately determine the orientation of the insulators in the images. Technical solutions that address this and other drawbacks are described herein.

SUMMARY

In one or more example embodiments, a computer-implemented method for detecting and correcting an orientation of a target object in an image is disclosed. The method includes training a deep neural network using a set of training images. The method further includes providing the image as input to the trained deep neural network, where the image is a segmented image and utilizing the deep neural network to determine an initial orientation prediction for the target object. The method additionally includes utilizing the deep neural network to obtain a rectified image from the segmented image based at least in part on the initial orientation prediction, where an orientation of the target object in the rectified image is within a threshold value of a target orientation.

In one or more other example embodiments, a system for detecting and correcting an orientation of a target object in an image is disclosed. The system includes at least one memory storing computer-executable instructions and at least one processor configured to access the at least one memory and execute the computer-executable instructions to perform a set of operations. The operations include training a deep neural network using a set of training images. The operations further include providing the image as input to the trained deep neural network, where the image is a segmented image and utilizing the deep neural network to determine an initial orientation prediction for the target object. The operations additionally include utilizing the deep neural network to obtain a rectified image from the segmented image based at least in part on the initial orientation prediction, where an orientation of the target object in the rectified image is within a threshold value of a target orientation.

In one or more other example embodiments, a computer program product for detecting and correcting an orientation of a target object in an image is disclosed. The computer program product includes a non-transitory storage medium readable by a processing circuit, the storage medium storing instructions executable by the processing circuit to cause a method to be performed. The method includes training a deep neural network using a set of training images. The method further includes providing the image as input to the trained deep neural network, where the image is a segmented image and utilizing the deep neural network to determine an initial orientation prediction for the target object. The method additionally includes utilizing the deep neural network to obtain a rectified image from the segmented image based at least in part on the initial orientation prediction, where an orientation of the target object in the rectified image is within a threshold value of a target orientation.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
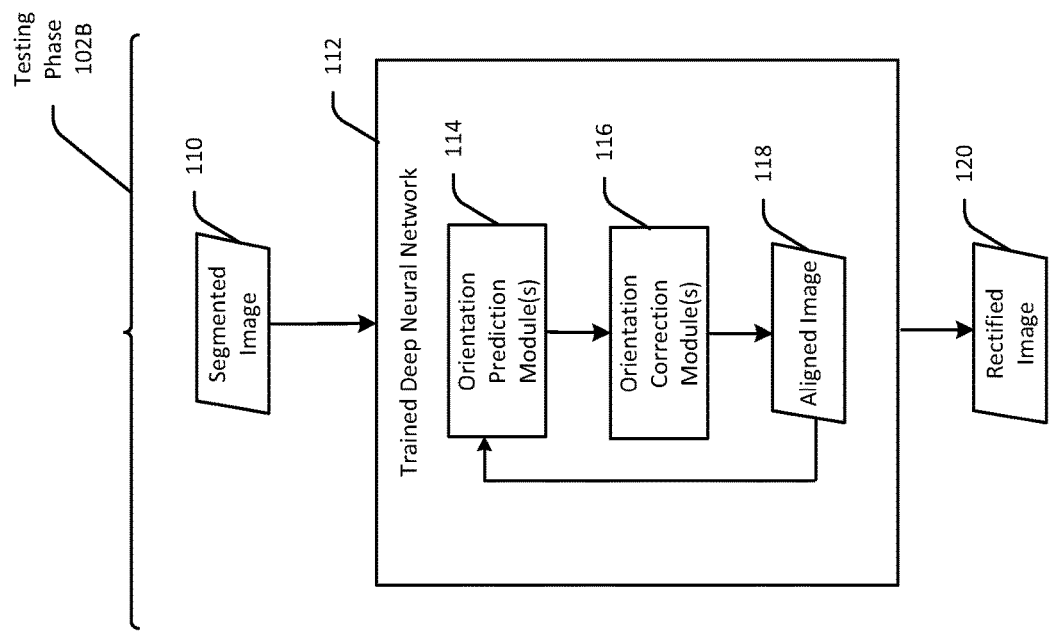
FIG. 1 is a schematic hybrid block/data flow diagram illustrating orientation detection and correction of a target object in a segmented image in accordance with example embodiments.
Figure 1:
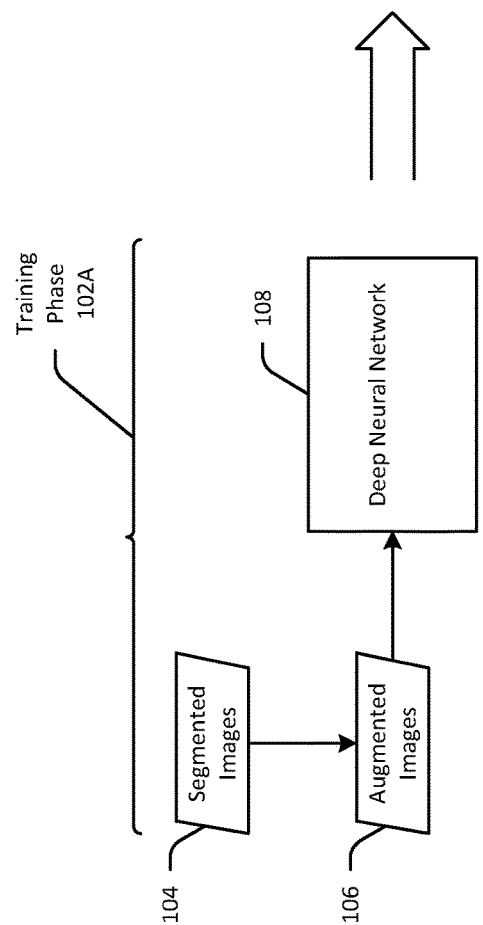

Example embodiments of the invention relate to, among other things, systems, methods, computer-readable media, techniques, and methodologies for determining the orientation of a target object in an image and iteratively reorienting the target object until an orientation of the target object is within an acceptable threshold of a target orientation. Example embodiments of the invention also relate to, among other things, systems, methods, computer-readable media, techniques, and methodologies for verifying that an image contains a target object.

In example embodiments, the target object may be an insulator such as an overhead line insulator. Images of insulators may be captured, for example, using aerial surveillance from a drone, helicopter, or the like. Because the images may be captured from any number of angles/perspectives, the insulators in the images may be oriented in multiple different orientations. More specifically, across multiple images of insulators, the insulators may be oriented at any angle with respect to the horizontal or the vertical. Example embodiments of the invention are capable of detecting an orientation of an insulator in an image and generating a rectified image in which the insulator is reoriented to be substantially horizontal or substantially vertical. Reorienting an insulator in this manner makes it easier to identify potential issues with the insulator such as damage to the insulator (e.g., cracks in the insulator).

In example embodiments, a set of captured images of insulators having known orientations may be used as training data to train a deep neural network to classify insulator images based on orientation. This set of captured insulator images may be augmented in certain example embodiments, and the augmented set of images may constitute the training data. Augmenting the set of captured insulator images may include, for example, generating multiple additional images from any given insulator image, where each additional image includes the insulator rotated to an orientation corresponding to one of multiple possible orientations.

Each possible orientation may correspond to a respective classification bin. In example embodiments, the classification bins may be equally spaced. In example embodiments, each successive classification bin may correspond to an orientation of an insulator with respect to a horizontal or a vertical that differs by x degrees from respective orientations corresponding to each of the neighboring bins of the classification bin. For instance, in example embodiments, a first classification bin may correspond to a zero degree orientation representing the horizontal, a second classification bin may correspond to a 10 degree orientation with respect to the horizontal, a third classification bin may correspond to a 20 degree orientation with respect to the horizontal, and so forth. In example embodiments, because insulators are symmetric objects, 18 classification bins may be used, where each classification bin represents a respective multiple of 10 degrees orientation with respect to the horizontal or vertical. In example embodiments, additional classification bins corresponding to a 180 degree orientation, a 190 degree orientation, a 200 degree orientation, and so forth may not be required because these orientations may be indistinguishable from a 0 degree orientation, a 10 degree orientation, a 20 degree orientation, and so forth, respectively, due to the symmetric nature of the insulators.

After training of the deep neural network using the augmented set of images, an image of an insulator having an unknown orientation may be provided as input to the trained deep neural network. The insulator image may be a segmented image in which an insulator previously detected to have been present in the image is represented by, for example, a bounding box indicative of a location of the detected insulator in the image. In certain example embodiments, an image may include multiple insulators, in which case, the corresponding segmented image may include multiple bounding boxes indicative of the detected positions of the multiple insulators in the image.

In example embodiments, the deep neural network may determine an initial orientation prediction for an insulator in the segmented image. More specifically, the deep neural network may generate a classification probability distribution indicative of a respective predicted likelihood for each of the classification bins that the orientation of the insulator falls within that classification bin. In example embodiments, a classification bin that receives the highest classification score (e.g., the largest probability) may be indicative of the initial predicted orientation of the insulator.

In example embodiments, the initial orientation prediction may be compared to a desired target orientation to determine how the difference between the two compares to a threshold value. In particular, in example embodiments, if the difference between the initial orientation prediction and the desired target orientation exceeds a threshold allowable deviation, an aligned image may be generated by aligning the segmented image to the target orientation based at least in part on the initial orientation prediction. For instance, if i) the initial prediction is that the insulator is oriented at 20 degrees from the horizontal (e.g., the classification bin corresponding to 20 degrees received the highest classification score), ii) the target orientation is 0 degrees (representing the horizontal), and iii) the threshold allowable deviation is 5 degrees, the aligned image may be generated by rotating the insulator in the segmented image (or more specifically the bounding box representative of the insulator) by 20 degrees. In certain example embodiments, the angle by which the insulator is rotated may be more or less than the difference between an orientation prediction and a target orientation depending on classification scores associated with classification bins that neighbor the classification bin corresponding to the predicted orientation. These example embodiments will be described in more detail later in this disclosure in reference to the illustrative method 400 of FIG. 4.

In example embodiments, the aligned image may be provided as input to the deep neural network, which may then generate a refined orientation prediction based on the aligned image. In example embodiments, the refined orientation prediction may result in a new classification bin receiving the highest classification score. The refined orientation prediction may then be compared to the target orientation, and the process described earlier may continue iteratively until an orientation prediction is obtained that is within the threshold allowable deviation from the target orientation, in which case, the aligned image corresponding to such an orientation prediction may be output as a rectified image in which the insulator is substantially oriented in the target orientation. In example embodiments, defects or damage to an insulator may be more easily identified from the rectified image in which the insulator is substantially oriented in the target orientation than from the original image.

In certain example embodiments, the trained deep neural network may be used to verify the presence of an insulator in the segmented image in addition to performing orientation detection and correction. In particular, a deep neural network trained to perform orientation classification may be used in conjunction with one or more additional layers that receive the classification output of the deep neural network and learn to detect the presence or absence of an insulator in a segmented image using ground-truth training data that includes the training data used to train the deep neural network as well as images known to not contain any insulators. In this manner, the deep neural network may be trained to output orientation prediction and insulator verification together in a single forward pass.

While example embodiments may be described herein in connection with orientation prediction and correction for images of insulators, it should be appreciated that the object whose orientation is being predicted and corrected can be any suitable target object. Further, while in example embodiments, an insulator is assumed to be symmetric and the number of classification bins depends on this assumed symmetry, in other example embodiments, the target object may be asymmetric and any suitable number of classification bins may be used. In addition, the term deep neural network is not intended to be limiting with respect to the type of neural network or machine learning technique that may be used to perform the multi-stage classification described herein.

Illustrative methods in accordance with example embodiments of the invention will now be described. It should be noted that any given operation of any of the methods 200-400 may be performed by one or more of the program modules or the like depicted in FIG. 1 and/or in FIG. 5, whose operation will be described in more detail later in this disclosure. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
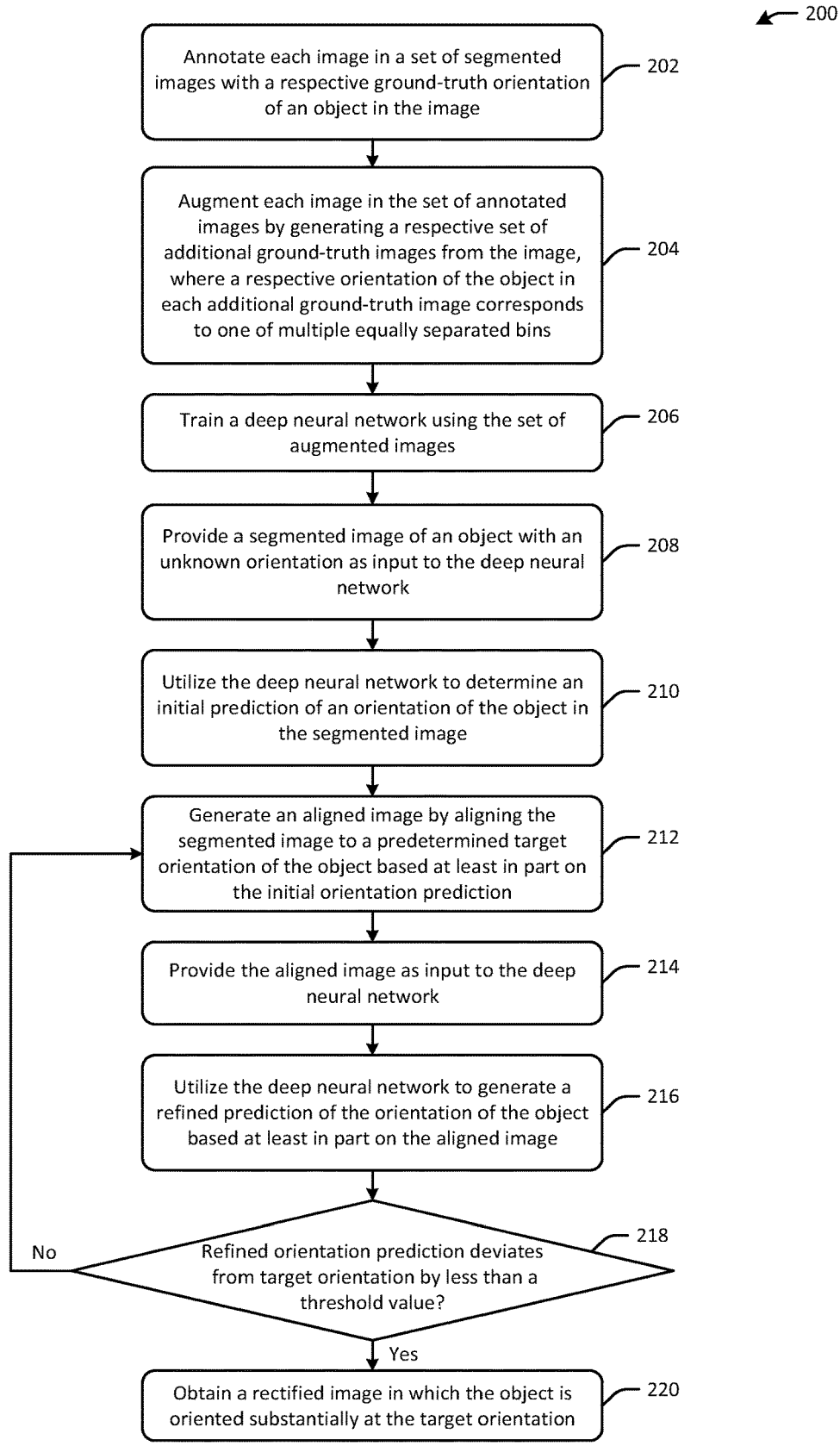
FIG. 2 is a process flow diagram of an illustrative method for orientation detection and correction of a target object in a segmented image in accordance with example embodiments.
Figure 3:
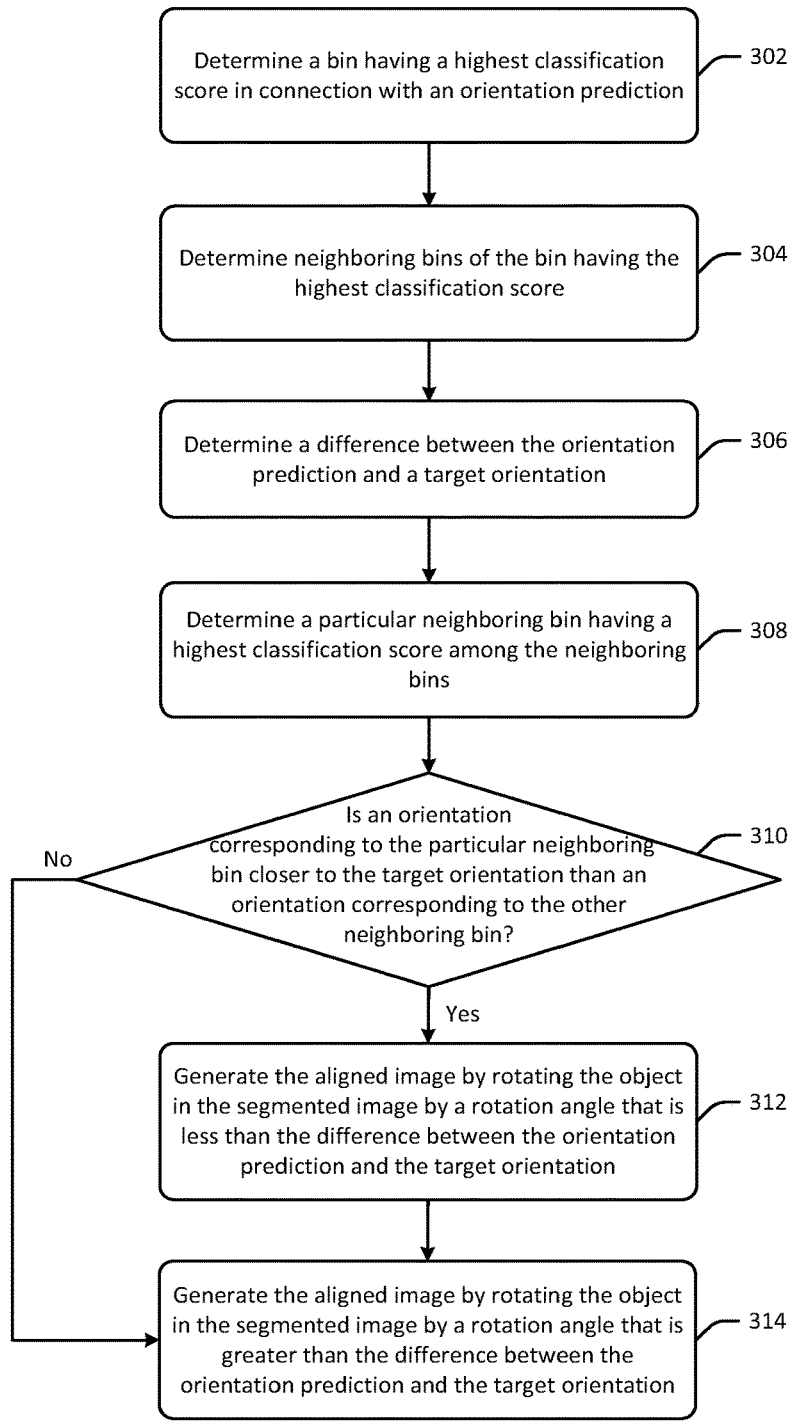
FIG. 3 is a process flow diagram of an illustrative method for generating an aligned image from a segmented image to refine an orientation prediction in accordance with example embodiments.

FIG. 1 is a schematic hybrid block/data flow diagram illustrating orientation detection and correction of a target object in a segmented image in accordance with example embodiments. FIG. 2 is a process flow diagram of an illustrative method 200 for orientation detection and correction of a target object in a segmented image in accordance with example embodiments. FIG. 3 is a process flow diagram of an illustrative method 300 for generating an aligned image from the segmented image to refine an orientation prediction in accordance with example embodiments. Each of FIGS. 2 and 3 will be described in conjunction with FIG. 1 hereinafter.

Referring now to FIG. 2 in conjunction with FIG. 1, at block 202 of the method 200, each image in a set of segmented images 104 may be annotated with a respective ground-truth orientation of a target object in the image. In example embodiments, the target object may be an overhead line insulator. More specifically, in example embodiments, each image in the set of segmented images 104 may be labeled with a known orientation of a target object (or multiple known orientations of multiple target objects) in the image. The annotated segmented images 104 may serve as at least a portion of training data for training a deep neural network 108 during a training phase 102A.

At block 204 of the method 200, the annotated segmented images 104 may be augmented to yield a set of augmented images 106. The set of augmented images 106 may be an expanded set of images that includes the annotated segmented images 104 as well as additional images generated from each of the segmented images 104. More specifically, a given segmented image 104 may be augmented by rotating the target object in the segmented image 104 from its known orientation to each of multiple different orientations corresponding to different classification bins of the deep neural network 108.

In example embodiments, each orientation of the target object in an augmented image 106 may correspond to a respective classification bin. In example embodiments, the classification bins may be equally spaced. For example, each successive classification bin may correspond to an orientation of the target object with respect to a horizontal or a vertical that differs by x degrees from respective orientations corresponding to neighboring bins of the classification bin. As a non-limiting example, a first classification bin may correspond to a zero degree orientation representing the horizontal, a second classification bin may correspond to a 10 degree orientation with respect to the horizontal, a third classification bin may correspond to a 20 degree orientation with respect to the horizontal, and so forth. In this example, the set of augmented images 106 for a given segmented image 104 may include an augmented image in which the target object in the segmented image 104 is rotated to the 0 degree orientation, an augmented image in which the target object is rotated to the 10 degree orientation, an augmented image in which the target object is rotated to the 20 degree orientation, and so forth. It should be appreciated that the target object in a segmented image 104 may be at any orientation, and in particular, at an orientation that does not correspond to one of the classification bins (e.g., a 12 degree orientation). Notwithstanding this, the target object in a segmented image 104 may be rotated to respective orientations corresponding to the classification bins to generate the set of augmented images 106 for that segmented image 104.

In example embodiments, if the target object is symmetric (e.g., an insulator), 18 classification bins may be used, where each classification bin represents a respective multiple of 10 degrees orientation with respect to the horizontal or vertical. In such example embodiments, additional classification bins corresponding to a 180 degree orientation, a 190 degree orientation, a 200 degree orientation, and so forth may not be required because these orientations may be indistinguishable from a 0 degree orientation, a 10 degree orientation, a 20 degree orientation, and so forth, respectively.

At block 206 of the method 200, the deep neural network 108 may be trained using the set of augmented images 106 during the training phase 102A. Specifically, the deep neural network 108 may be trained to perform orientation classification using the set of augmented images 106. As previously noted, the deep neural network 108 may be any suitable type of neural network (e.g., a convolutional neural network) or other machine learning technique/construct.

After training of the deep neural network 108 using the augmented set of images 106, a trained deep neural network 112 may be obtained. Then, as part of a testing phase 102B of the trained deep neural network 112, a segmented image 110 of a target object having an unknown orientation may be provided as input to the trained deep neural network 112 at block 208 of the method 200. The segmented image 110 may be an image in which a target object previously detected to have been present in the image is represented by, for example, a bounding box indicative of a location of the detected target object in the image. In certain example embodiments, the segmented image 110 may include multiple bounding boxes or the like representing the positions of multiple target objects detected in the original image.

At block 210 of the method 200, computer-executable instructions of one or more orientation prediction modules 114 of the deep neural network 112 may be executed to determine an initial orientation prediction for a target object in the segmented image 110. More specifically, the deep neural network 112 may generate a classification probability distribution indicative of a respective predicted likelihood for each of the classification bins that the orientation of the target object in the segmented image 110 falls within that classification bin. In example embodiments, a classification bin that receives the highest classification score (e.g., the largest probability) may be indicative of the initial predicted orientation of the target object.

In example embodiments, the initial orientation prediction may be compared to a desired target orientation to determine how the difference between the two compares to a threshold value. In particular, in example embodiments, if the difference between the initial orientation prediction and the desired target orientation exceeds a threshold allowable deviation, computer-executable instructions of one or more orientation correction modules 116 may be executed at block 212 of the method 200 to generate an aligned image 118 from the segmented image 110 (the illustrative method 200 assumes that the initial orientation prediction deviates from the target orientation by more than the threshold allowable deviation).

In example embodiments, the aligned image 118 may be generated by aligning the segmented image 110 to the target orientation based at least in part on the initial orientation prediction. As a non-limiting example, if the initial prediction is that the target object is oriented at 10 degrees from the horizontal (e.g., the classification bin corresponding to 10 degrees received the highest classification score), ii) the target orientation is 0 degrees (representing the horizontal), and iii) the threshold allowable deviation is 5 degrees, the aligned image 118 may be generated by rotating the target object in the segmented image 110 (or more specifically the bounding box representative of the target object) by 10 degrees.

In certain example embodiments, the angle by which the target object is rotated may be more or less than the difference between the initial orientation prediction and the target orientation depending on classification scores associated with classification bins that neighbor the classification bin corresponding to the predicted orientation. FIG. 3 is a process flow diagram that depicts an illustrative method 300 for utilizing classification scores of neighboring classification bins to determine the angle of rotation of the target object to generate the aligned image 118. The method 300 may be performed in connection with generating the aligned image 118 from the segmented image 110 or in connection with generating an updated aligned image from an aligned image of a previous iteration of the method 200. In example embodiments, operations of the method 300 may be performed responsive to execution of computer-executable instructions of the orientation correction module(s) 116.

Referring now to FIG. 3, at block 302 of the method 300, a classification bin having a highest classification score in connection with an orientation prediction (e.g., the initial orientation prediction) may be determined. As a non-limiting example, if the neural network 112 predicts that the orientation of a target object in the segmented image 110 is oriented at 10 degrees from the horizontal, the classification bin having the highest classification score would be the classification bin that corresponds to 10 degrees.

At block 304 of the method 300, neighboring bins of the classification bin having the highest classification score may be determined. Referring again to the non-limiting example from above, the neighboring bins may be the classification bin corresponding to 0 degrees and the classification bin corresponding to 20 degrees.

At block 306 of the method 300, a difference between the orientation prediction and a target orientation of the target object may be determined. Referring again to the non-limiting example from above, if the initial orientation prediction for the segmented image 110 is 10 degrees and the target orientation is 0 degrees, the difference there between would be 10 degrees.

At block 308 of the method 300, a particular neighboring bin having a highest classification score among the neighboring bins may be determined. Referring again to the non-limiting example from above, the neighboring bin (i.e., either the 0 degrees bin or the 20 degrees bin) having the higher classification score may be determined. More specifically, in example embodiments, the classification bin corresponding to the orientation prediction may have the highest overall classification score among all classification bins, while one of the neighboring bins may have the second highest overall classification score among all classification bins and a larger classification score than the other neighboring bin.

At block 310 of the method 300, a determination may be made as to whether an orientation corresponding to the particular neighboring bin with the higher classification score between the two neighboring bins is closer to the target orientation than an orientation corresponding to the other neighboring bin. In response to a positive determination at block 310, the method 300 may proceed to block 312 where the aligned image 118 may be generated by rotating the target object in the segmented image 110 by a rotation angle that is less than the difference between the orientation prediction and the target orientation. On the other hand, in response to a negative determination at block 310, the method 300 may proceed to block 314 where the aligned image 118 may be generated by rotating the target object in the segmented image 110 by a rotation angle that is greater than the difference between the orientation prediction and the target orientation.

Referring again to the non-limiting example from above, assuming that the orientation prediction corresponds to the 10 degrees classification bin and the 0 degrees neighboring classification bin has a higher classification score than the 20 degrees neighboring classification bin, then the rotation angle would be less than the difference between the orientation prediction and the target orientation (i.e., 10 degrees-0 degrees=10). For instance, as a non-limiting example, the rotation angle may be 8 degrees. The rotation angle is reduced from the 10 degrees difference between the orientation prediction and the target orientation because the deep neural network 112 has assigned a higher classification probability to the 0 degrees neighboring bin than the 20 degrees neighboring bin, and thus, has effectively predicted that the actual orientation of the target object in the segmented image 110 is more likely to be closer to the target orientation than what is indicated by the predicted orientation alone. On the other hand, if we assume that the 20 degrees neighboring classification bin has a higher classification score than the 0 degrees neighboring classification bin, the rotation angle may be increased from the 10 degrees difference between the orientation prediction and the target orientation because the deep neural network 112 has effectively predicted that the actual orientation of the target object in the segmented image 110 is more likely to be farther away from the target orientation than what is indicated by the predicted orientation alone. In this example scenario, the rotation angle may be greater than the difference between the orientation prediction and the target orientation (e.g., 10 degrees). For example, the rotation angle may be 12 degrees.

In certain example embodiments, regardless of whether the rotation angle is increased to be above the difference between orientation prediction and the target orientation or decreased to be below the difference between the orientation prediction and the target orientation, the amount of the increase or decrease may be less than half the difference between successive classification bins (assuming that the classification bins are equally spaced). Referring again to the non-limiting example from above, the rotation angle may be increased or decreased by less than 5 degrees, or in other words, less than half of the degree interval between successive classification bins (e.g., 10 degrees). This may be the case because the classification scores of the neighboring bins—while being greater than the classification scores of other classification bins—may generally be less than the classification score of the classification bin corresponding to the orientation prediction. In those example embodiments in which the classification scores of two successive classification bins are equal or substantially equal, the rotation angle may be increased or decreased by an amount that is half the difference between the classification bins.

Further, example embodiments in which the orientation prediction corresponds to a classification bin representing the target orientation may constitute a special case. For instance, if the orientation prediction corresponds to the 0 degrees classification bin, which is also the target orientation, then the neighboring bin with the higher classification score (e.g., 170 degrees or 10 degrees) may determine the direction of rotation (e.g., clockwise or counterclockwise) of the target object rather than the amount by which the rotation angle is modified. For example, if the 170 degrees neighboring bin has a higher classification score than the 10 degrees bin, then the target object may be rotated in a first direction (e.g., counterclockwise), whereas if the 0 degrees bin has a higher classification score than the 170 degrees bin, then the target object may be rotated in a second different direction (e.g., clockwise). It should be appreciated that the above example embodiments that utilize the classification scores of neighboring classification bins to determine rotation angles and/or rotation direction are merely illustrative and not exhaustive.

Referring again to FIG. 2, at block 214 of the method 200, the aligned image may be provided as input to the deep neural network 112. Then, at block 216 of the method 200, computer-executable instructions of the orientation prediction module(s) 114 may be executed to generate a refined orientation prediction based on the aligned image 118. In example embodiments, the refined orientation prediction may result in a new classification bin receiving the highest classification score. The new classification bin may correspond to an orientation that is closer to the target orientation than the initial orientation prediction. For example, if the initial orientation prediction corresponds to the 20 degrees classification bin, the refined orientation prediction may correspond to the 10 degrees classification bin.

At block 218 of the method 200, the refined orientation prediction may be compared to the target orientation to determine whether the refined orientation prediction is within a threshold value, such as a threshold allowable deviation, from the target orientation. In response to a positive determination at block 218, the aligned image 118 may be output as a rectified image 120 in which the target object is substantially oriented in the target orientation. On the other hand, in response to a negative determination at block 218, the method may proceed iteratively from block 212 where a new aligned image is generated from the aligned image 118 and a new refined orientation prediction associated with the new aligned image is compared to the target orientation to determine if the difference there between is within the threshold allowable deviation. The method 200 may proceed iteratively in this fashion through as many iterations as may be needed to obtain convergence, or in other words, an aligned image having a refined orientation prediction that is within the threshold allowable deviation from the target orientation, in which case, the aligned image for which convergence is obtained is output as the rectified image 120.

Figure 4:
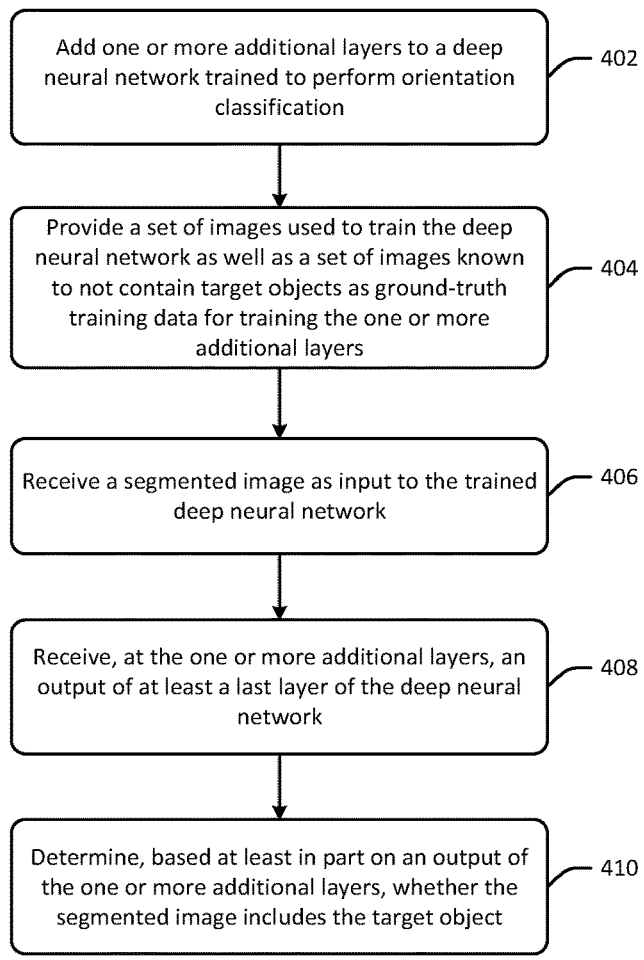
FIG. 4 is a process flow diagram of an illustrative method for verifying that a segmented image includes a target object in accordance with example embodiments.

As previously noted, in certain example embodiments, the trained deep neural network 112 may be used to verify the presence of a target object in the segmented image 110 in addition to performing orientation detection and correction. FIG. 4 is a process flow diagram of an illustrative method 400 for verifying that a segmented image includes a target object in accordance with example embodiments. Operations of the method 400 may be performed responsive to execution of computer-executable instructions of one or more target object verification modules 524 (depicted in FIG. 5).

At block 402 of the method 400, one or more additional layers may be added to the trained deep neural network 112. In particular, the neural network 112 that is trained as an orientation classifier can be extended to support target object verification by reusing, for example, the last and second to last fully-connected layers of the neural network 112 and adding the additional layers at block 402.

At block 404 of the method 400, a set of images used to train the neural network 112 as well as a set of images known to not contain target objects may be provided as ground-truth training data for the training the one or more additional layers. During training of the one or more additional layers, the functional layers of the neural network 112 trained for target object orientation detection may be fixed such that only the additional layer(s) are learning.

At block 406 of the method 400, a segmented image (e.g., the segmented image 110) may be received as input to the trained neural network 112. At block 408 of the method 400, an output of at least a last layer (e.g., a last fully-connected layer) of the neural network 112 may be received as input at the additional layer(s). At block 410 of the method 400, a determination may be made as to whether the segmented image includes the target object based at least in part on the output of the additional layer(s). In this manner, the deep neural network 112 may be trained to output orientation prediction and target object verification together in a single forward pass.

Example embodiments described herein provide a number of technical effects and technical benefits over conventional solutions. In particular, example embodiments define a new data structure, specifically a new type of neural network implementation that is capable of performing orientation detection and correction of a target object in an image to generate a rectified image in which the target object is oriented at a desired target orientation. The rectified image enables more efficient analysis of the target object such as an assessment of any failure conditions that may be present with the target object. Thus, example embodiments that utilize a trained orientation classifier to generate a rectified image yield a technical effect over conventional solutions that are not capable of producing such a rectified image through machine learning techniques. Thus, a trained neural network for orientation classification in accordance with example embodiments constitutes an improvement to neural network computer-based technology.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure. For example, the data key generation process described herein in accordance with example embodiments can be expanded to use multiple data seeds to produce one set of unique and reproducible data for each data seed.

Figure 5:
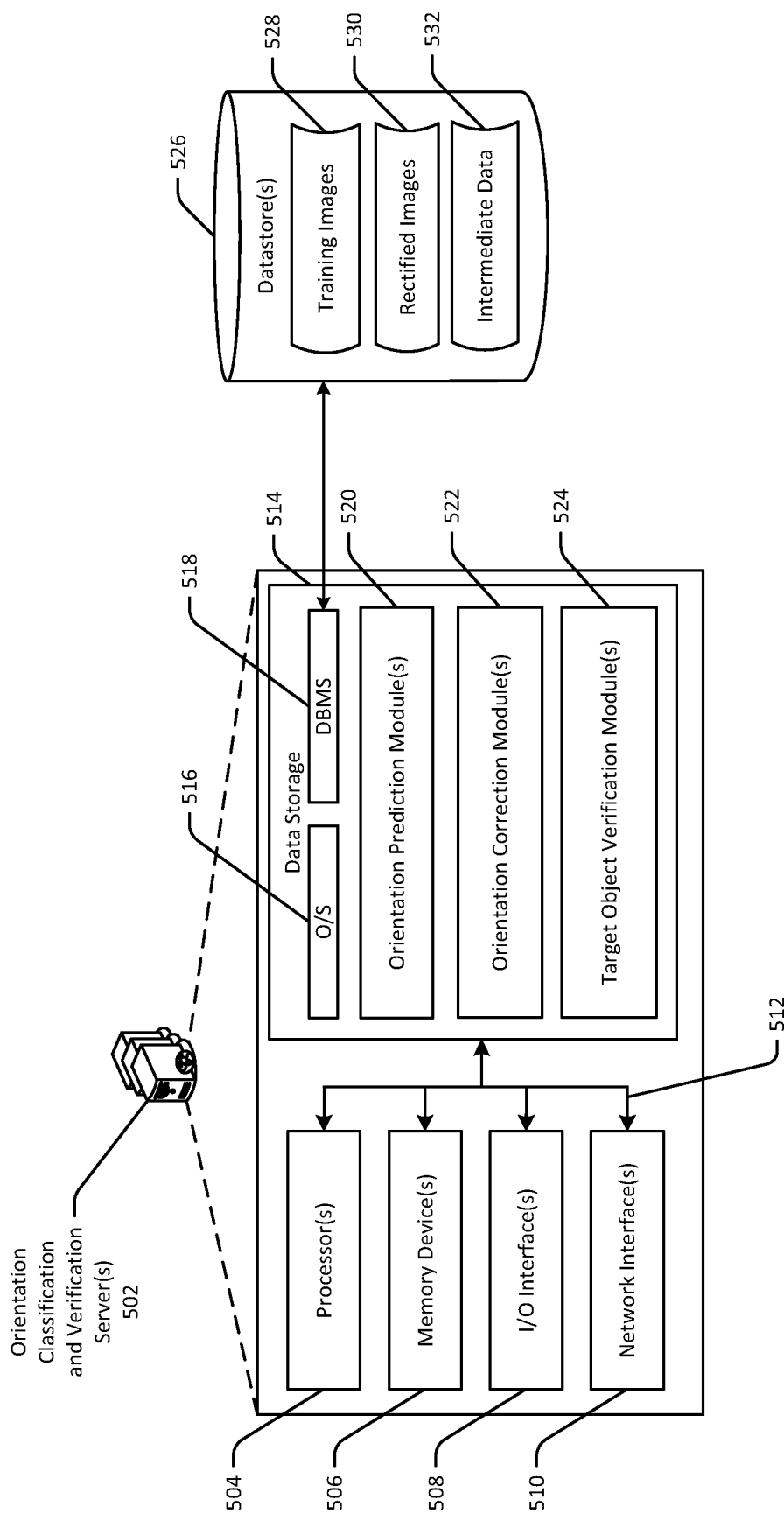
FIG. 5 is a schematic diagram of an illustrative computing configuration for implementing one or more example embodiments.

FIG. 5 is a schematic diagram of an illustrative computing configuration for implementing one or more example embodiments of the invention. In particular, FIG. 5 depicts one or more orientation classification and verification servers 502 configured to implement one or more example embodiments. While the orientation classification and verification server(s) 502 may be described herein in the singular, it should be appreciated that multiple servers 502 may be provided, and functionality described herein may be distributed across multiple such servers 502.

In an illustrative configuration, the orientation classification and verification server 502 may include one or more processors (processor(s)) 504, one or more memory devices 506 (generically referred to herein as memory 506), one or more input/output ("I/O") interface(s) 508, one or more network interfaces 510, and data storage 514. The orientation classification and verification server 502 may further include one or more buses 512 that functionally couple various components of the orientation classification and verification server 402.

The bus(es) 512 may include at least one of a system bus, a memory bus, an address bus, or a message bus, and may permit the exchange of information (e.g., data (including computer-executable code), signaling, etc.) between various components of the orientation classification and verification server 502. The bus(es) 512 may include, without limitation, a memory bus or a memory controller, a peripheral bus, an accelerated graphics port, and so forth. The bus(es) 512 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 506 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 506 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 506 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 506 and the data storage 514, removable and/or non-removable, are examples of computer-readable storage media (CRSM) as that term is used herein.

The data storage 514 may store computer-executable code, instructions, or the like that may be loadable into the memory 506 and executable by the processor(s) 504 to cause the processor(s) 504 to perform or initiate various operations. The data storage 514 may additionally store data that may be copied to memory 506 for use by the processor(s) 504 during the execution of the computer-executable instructions. Moreover, output data generated as a result of execution of the computer-executable instructions by the processor(s) 504 may be stored initially in memory 506 and may ultimately be copied to data storage 514 for non-volatile storage.

More specifically, the data storage 514 may store one or more operating systems (O/S) 516; one or more database management systems (DBMS) 518 configured to access the memory 506 and/or one or more datastores 526; and one or more program modules, applications, engines, managers, computer-executable code, scripts, or the like such as, for example, one or more orientation prediction modules 520, one or more orientation correction modules 522, and one or more target object verification modules 524. Any of the components depicted as being stored in data storage 514 may include any combination of software, firmware, and/or hardware. The software and/or firmware may include computer-executable instructions (e.g., computer-executable program code) that may be loaded into the memory 506 for execution by one or more of the processor(s) 504 to perform any of the operations described earlier.

Although not depicted in FIG. 5, the data storage 514 may further store various types of data utilized by components of the orientation classification and verification server 502 (e.g., data stored in the datastore(s) 424). Any data stored in the data storage 514 may be loaded into the memory 506 for use by the processor(s) 504 in executing computer-executable instructions. In addition, any data stored in the data storage 514 may potentially be stored in the external datastore(s) 526 and may be accessed via the DBMS 518 and loaded in the memory 506 for use by the processor(s) 504 in executing computer-executable instructions.

The processor(s) 504 may be configured to access the memory 506 and execute computer-executable instructions loaded therein. For example, the processor(s) 504 may be configured to execute computer-executable instructions of the various program modules, applications, engines, managers, or the like of the orientation classification and verification server 502 to cause or facilitate various operations to be performed in accordance with one or more embodiments of the disclosure. The processor(s) 504 may include any suitable processing unit capable of accepting data as input, processing the input data in accordance with stored computer-executable instructions, and generating output data. The processor(s) 504 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 504 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 504 may be capable of supporting any of a variety of instruction sets.

Referring now to other illustrative components depicted as being stored in the data storage 514, the O/S 516 may be loaded from the data storage 514 into the memory 506 and may provide an interface between other application software executing on the orientation classification and verification server 502 and hardware resources of the orientation classification and verification server 502. More specifically, the O/S 516 may include a set of computer-executable instructions for managing hardware resources of the orientation classification and verification server 502 and for providing common services to other application programs. In certain example embodiments, the O/S 516 may include or otherwise control the execution of one or more of the program modules, engines, managers, or the like depicted as being stored in the data storage 514. The O/S 516 may include any operating system now known or which may be developed in the future including, but not limited to, any server operating system, any mainframe operating system, or any other proprietary or non-proprietary operating system.

The DBMS 518 may be loaded into the memory 506 and may support functionality for accessing, retrieving, storing, and/or manipulating data stored in the memory 506, data stored in the data storage 514, and/or data stored in external datastore(s) 526. The DBMS 518 may use any of a variety of database models (e.g., relational model, object model, etc.) and may support any of a variety of query languages. The DBMS 518 may access data represented in one or more data schemas and stored in any suitable data repository. As such, data stored in the datastore(s) 526 may include, for example, training images 528, rectified images 530, and intermediate data 532 generated, for example, by a neural network disclosed herein. External datastore(s) 526 that may be accessible by the orientation classification and verification server 502 via the DBMS 518 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the orientation classification and verification server 502, the input/output (I/O) interface(s) 508 may facilitate the receipt of input information by the orientation classification and verification server 502 from one or more I/O devices as well as the output of information from the orientation classification and verification server 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the Orientation classification and verification server 502 or may be separate. The I/O devices may further include, for example, any number of peripheral devices such as data storage devices, printing devices, and so forth.

The I/O interface(s) 508 may also include an interface for an external peripheral device connection such as universal serial bus (USB), FireWire, Thunderbolt, Ethernet port or other connection protocol that may connect to one or more networks. The I/O interface(s) 508 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The orientation classification and verification server 502 may further include one or more network interfaces 510 via which the orientation classification and verification server 502 may communicate with one or more other devices or systems via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 5 as being stored in the data storage 514 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the orientation classification and verification server 502 and/or other computing devices accessible via one or more networks, may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 5 may be implemented, at least partially, in hardware and/or firmware across any number of devices.

It should further be appreciated that the orientation classification and verification server 502 may include alternate and/or additional hardware, software, or firmware components beyond those described or depicted without departing from the scope of the disclosure. More particularly, it should be appreciated that software, firmware, or hardware components depicted as forming part of the orientation classification and verification server 502 are merely illustrative and that some components may not be present or additional components may be provided in various embodiments. While various illustrative modules have been depicted and described as software modules stored in data storage 514, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 200-400 may be performed by a orientation classification and verification server 502 having the illustrative configuration depicted in FIG. 5, or more specifically, by one or more program modules, engines, applications, or the like executable on such a device. It should be appreciated, however, that such operations may be implemented in connection with numerous other device configurations.

The operations described and depicted in the illustrative methods of FIGS. 2-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for detecting and correcting an orientation of a target object in an image, the method comprising:
    training a deep neural network using a set of training images;
    providing the image as input to the deep neural network, wherein the image is a segmented image;
    utilizing the deep neural network to determine an initial orientation prediction for the target object; and
    utilizing the deep neural network to obtain a rectified image from the segmented image based at least in part on the initial orientation prediction, wherein an orientation of the target object in the rectified image is within a threshold value of a target orientation,
    wherein utilizing the deep neural network to obtain the rectified image comprises:
        determining that the initial orientation prediction deviates from the target orientation by more than the threshold value; and
        generating an aligned image from the segmented image.

2. The computer-implemented method of claim 1, wherein generating the aligned image comprises rotating the target object in the segmented image to the target orientation based at least in part on the initial orientation prediction to obtain the aligned image.

3. The computer-implemented method of claim 2, further comprising:
    determining a classification bin having a highest classification score in connection with the initial orientation prediction;
    determining a first neighboring bin and a second neighboring bin of the classification bin having the highest classification score;
    determining a first orientation associated with the first neighboring bin and a second orientation associated with the second neighboring bin;
    determining a first classification score of the first neighboring bin and a second classification score of the second neighboring bin;
    determining that the first classification score is greater than the second classification score; and
    determining a rotation angle by which to rotate the target object in the segmented image based at least in part on a difference between the first orientation and the target orientation and a difference between the second orientation and the target orientation.

4. The computer-implemented method of claim 3, wherein determining the rotation angle further comprises:
    determining that the difference between the first orientation and the target orientation is less than the difference between the second orientation and the target orientation; and
    determining that the rotation angle is less than the difference between the initial orientation prediction and the target orientation.

5. The computer-implemented method of claim 1, further comprising:
    providing the aligned image as input to the deep neural network;
    utilizing the deep neural network to determine a refined orientation prediction for the target object;
    determining that the refined orientation prediction for the target object is within the threshold value of the target orientation; and
    outputting the aligned image as the rectified image.

6. The computer-implemented method of claim 1, further comprising utilizing the trained deep neural network to verify that the target object is present in the segmented image.

7. A system for detecting and correcting an orientation of a target object in an image, the system comprising:
- at least one memory storing computer-executable instructions; and
- at least one processor, wherein the at least one processor is configured to access the at least one memory and execute the computer-executable instructions to:
  - train a deep neural network using a set of training images;
  - provide the image as input to the deep neural network, wherein the image is a segmented image;
  - utilize the deep neural network to determine an initial orientation prediction for the target object; and
  - utilize the deep neural network to obtain a rectified image from the segmented image based at least in part on the initial orientation prediction, wherein an orientation of the target object in the rectified image is within a threshold value of a target orientation,
  - wherein the at least one processor is configured to utilize the deep neural network to obtain the rectified image by executing the computer-executable instructions to:
    - determine that the initial orientation prediction deviates from the target orientation by more than the threshold value; and
    - generate an aligned image from the segmented image.

8. The system of claim 7, wherein the at least one processor is configured to generate the aligned image by executing the computer-executable instructions to rotate the target object in the segmented image to the target orientation based at least in part on the initial orientation prediction to obtain the aligned image.

9. The system of claim 8, wherein the at least one processor is further configured to execute the computer-executable instructions to:
- determine a classification bin having a highest classification score in connection with the initial orientation prediction;
- determine a first neighboring bin and a second neighboring bin of the classification bin having the highest classification score;
- determine a first orientation associated with the first neighboring bin and a second orientation associated with the second neighboring bin;
- determine a first classification score of the first neighboring bin and a second classification score of the second neighboring bin;
- determine that the first classification score is greater than the second classification score; and
- determine a rotation angle by which to rotate the target object in the segmented image based at least in part on a difference between the first orientation and the target orientation and a difference between the second orientation and the target orientation.

10. The system of claim 9, wherein the at least one processor is configured to determine the rotation angle by executing the computer-executable instructions to:
- determine that the difference between the first orientation and the target orientation is less than the difference between the second orientation and the target orientation; and
- determine that the rotation angle is less than the difference between the initial orientation prediction and the target orientation.

11. The system of claim 7, wherein the at least one processor is further configured to execute the computer-executable instructions to:
- provide the aligned image as input to the deep neural network;
- utilize the deep neural network to determine a refined orientation prediction for the target object;
- determine that the refined orientation prediction for the target object is within the threshold value of the target orientation; and
- output the aligned image as the rectified image.

12. The system of claim 7, wherein the at least one processor is further configured to execute the computer-executable instructions to utilize the trained deep neural network to verify that the target object is present in the segmented image.

* * * * *